Dec. 29, 1942. H. J. MURPHY 2,307,004
ROTARY FASTENING DEVICE AND INSTALLATION OF THE SAME
Filed Nov. 26, 1941

Inventor:
Howard J. Murphy.
by John Todd
Atty.

Patented Dec. 29, 1942

2,307,004

UNITED STATES PATENT OFFICE 2,307,004

ROTARY FASTENER DEVICE AND INSTALLATION OF THE SAME

Howard J. Murphy, Greenwood, Mass., assignor to United-Carr Fastener Corporation, Cambridge, Mass., a corporation of Massachusetts Application November 26, 1941, Serial No. 420,552

13 Claims. (Cl. 24—221)

This invention aims to provide improvements in fastener devices for securing together two or more members, preferably plate-like, the device being of the so-called rotary operative type and adapted to draw the plates together on rotation of one part of the device relative to the other.

The chief object of my invention is the provision of a fastener device of simple and inexpensive construction having a socket member formed from one piece of sheet metal material and being adapted to cooperate with a stud member in the manner to draw the parts to be secured firmly together. The socket member is designed particularly to effect a support for a lateral projection of the stud member, which is rigid enough for most uses in connection with modern high-speed airplanes so as to limit movement of the plates away from each other flatwise within reasonable manufacturing tolerances. The socket member also provides integral spring means cooperating with the lateral projection of the stud member when the stud is turned to locking position to hold the projection in locked engagement with the socket member. The spring means of my present invention also cooperates with the lateral projection when the stud is turned to unlocked position to eject automatically the lateral projection from engagement with the socket member.

Other objects and uses of my invention will be apparent from inspection of the drawing and specification hereinbelow set forth.

In the drawing which illustrates a preferred embodiment of my invention:

Figure 1:
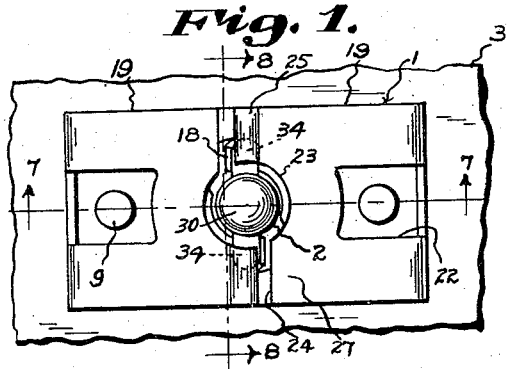
Fig. 1 is a top plan view showing an installation including two plate members secured together by means of my improved fastener device.

Referring to the drawing my fastener device comprises a socket unit 1 and a rotary unit 2. The socket unit 1 is secured on one side of a flat supporting plate 3 and the rotary unit 2 is carried by a flat supporting plate 4. The plate 3 has an aperture 5 adapted to receive a portion of the stud unit 2 and the plate 4 has an opening 6 through which the stud unit 2 projects. The opening 6 is preferably surrounded by a frustro-conical embossment 7 so that the plate 4 may present a flush outer surface when the rotary unit is finally assembled with the same. It will be seen that the diameter of the aperture 5 of the plate 3 is slightly greater than the diameter of the embossment 7 so that the plates 3 and 4 may be secured in flat abutting relation when the units of the fastener device are in locked relation.

Figure 5:
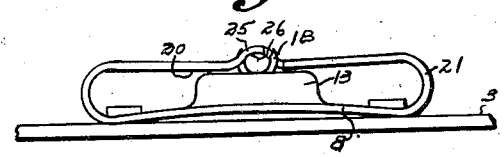
Fig. 5 is a side elevation of the socket member secured in assembly with one of the plates to be secured together.
Figure 6:
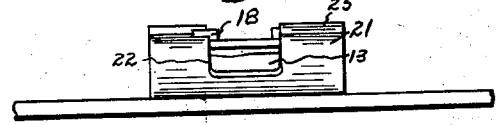
Fig. 6 is a view of the installation shown in Fig. 5 with the parts thereof turned 90°.
Figure 7:
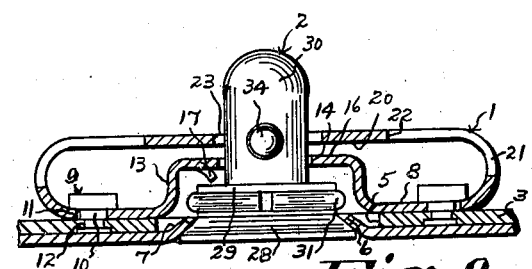
Fig. 7 is an enlarged section taken along the line 7—7 of Fig. 1.

Referring in detail to the socket unit 1, the member is formed from one piece of metal and provides an elongated base 8 preferably secured to the plate 3 by means of rivets 9 which have shank elements 10 (Fig. 7) projecting through openings 11 of the base 8 and openings 12 of the plate 3. The rivets are headed over on the outer sides of the base and plate member to secure the socket firmly to the plate member. In my preferred installation, the base 8 is bowed longitudinally, as illustrated in Fig. 5, to take up a variance of a few thousandths in the combined thickness of the plates to be secured together. I do not wish to be limited by this construction, however, as the fastener would be satisfactory for many applications if the base member were normally to lie in flush abutting relation with the plate 3 for its entire length.

The base member 8 has, in my preferred form, a raised element or embossment 13 intermediate its ends. The embossment 13 has an end surface providing a central opening 14 (Fig. 4) and lateral narrow extensions 15 of the opening 14 on opposite sides thereof. It will be seen that in my preferred construction, the central opening 14 and extensions 15 are formed from material entirely within the marginal edges of the embossment 13. The embossment 13 has locking surfaces 16 on opposite sides of the opening 14 extending from a downwardly bent lip or cam element 17 adjacent one of the extensions 15 to an upwardly bent stop lug 18 adjacent the other of the extensions 15. Each of the locking surfaces 16 has a flat portion 16ª intermediate its respective lip 17 and lug 18, but my fastener would be capable of efficient operation for many uses if the surfaces 16ª were slightly inclined. Locking means for engagement with the stud unit to hold the parts in locked position comprise an integral part of the socket unit. The locking means is in the form of a pair of spring arms or wing portions 19, which extend toward each other longitudinally of the fastener and provide broad lower faces 20 in superposed facing relation to the outer surface of the base 8. The wing portions 19 are integrally joined to respective longitudinal ends of the base 8 by bight elements 21 which provide most of the resilience in the wings. Portions of the wings 19 adjacent their free ends overlie the locking surfaces 16 and the wing may extend slightly downwardly from their junction with the bights 21 in the direction of the base 8 so that portions of the lower surfaces 20 act as cams in a manner to be described. Each of the wings 19 has an opening 22 adjacent its respective bight in alignment with a rivet-receiving opening 12 of the base 8 permitting a tool to be applied to the rivet to head over the same. Each of the wing elements 19 has a crescent-shaped opening 23 (Fig. 1) adjacent its free edge 24 to clear the stud unit, and each of the wings has a locking element 25 at its outermost end adjacent one side of the opening 23 to overlie one of the locking surfaces 16 of the base. The locking element preferably is in the form of a lip projecting upwardly out of the plane of its respective wing 19, viewing Fig. 3, and providing an inclined shoulder or abutment 26 on its under-surface for a purpose to be described. Each of the wing elements also has a portion 27 adjacent its outermost end on the opposite side of the opening 23 from the locking element 25 normally disposed in predetermined spaced relation to the embossment 13 and operable to aid ejection of the stud unit, as will be hereinafter more fully described.

Figure 2:
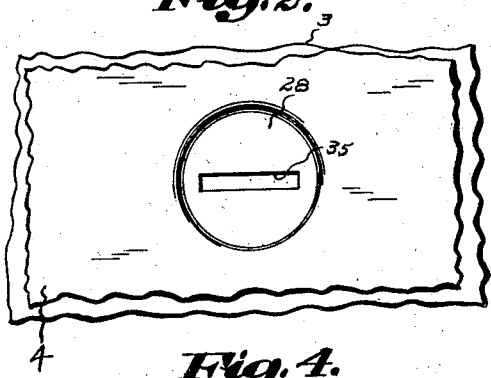
Fig. 2 is a rear view of the installation shown in Fig. 1.
Figure 8:
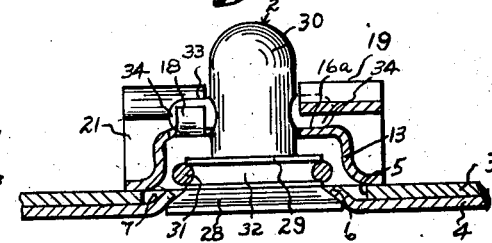
Fig. 8 is an enlarged section taken along the line 8—8 of Fig. 1.
Figure 9:
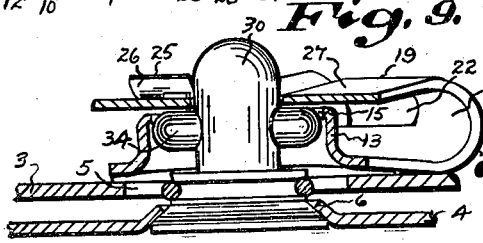
Fig. 9 is an enlarged section showing the manner in which the spring elements of the socket member operates to eject automatically the lateral projections of the stud member.

The rotary unit 2 comprises a head portion 28 which is larger in diameter than the opening 6 of the panel 4, and a shank having a base portion 29 which is slightly smaller in diameter than the opening 6 so as to project through the same. The shank has a nose 30 adapted to extend from the base 29 through the base element of the socket unit. The rotary unit is preferably secured in assembly with the plate 4 by a split ring 31 (Figs. 7 and 8) which is snapped into a groove 32 of the base 29. A pin 33 is driven or otherwise secured in an aperture of the nose 30 so that the opposite ends 34 of the pin extend laterally beyond the sides of the nose in a direction transverse to the normal axis of the shank. The head 28 preferably has a slot 35 (Fig. 2) to receive a tool or suitable implement by which the unit may be rotated.

Figure 3:
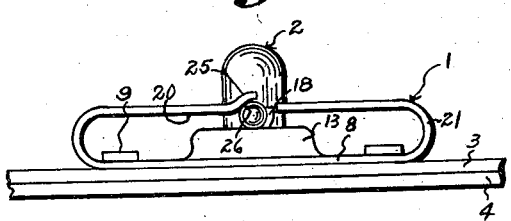
Fig. 3 is a side elevation of the installation shown in Figs. 1 and 2.
Figure 4:
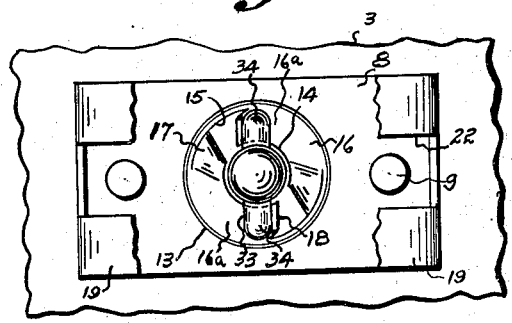
Fig. 4 is a top view similar to Fig. 1 with portions of the socket unit broken away to show more clearly the base element of the socket.

In fastening the plate 4 to the plate 3, the plates are brought into superposed relation with the embossment 7 disposed within the aperture 5. When the parts are in this relation, the nose 30 of the stud shank passes through the opening 14 of the base element and the pin ends 34 are in registration with the lateral extensions 15. Thereafter, the rotary member is turned in a counter-clockwise direction, viewing Fig. 4, causing the pin ends 34 to ride up the cam elements 17, at the same time drawing the plates 3 and 4 tightly together. During this action the combined thicknesses of the plates 3 and 4 may be such that the base element 8 of the socket unit is drawn down flat against the outer surface of the plate 3, as shown in Fig. 3, by the action of the pin ends riding up on the locking surfaces 16. Thus, the base element in flattened down position provides a rigid support for the pin ends so that no part of the fastener device is yieldable under forces tending to move the plates 3 and 4 away from each other flatwise. Even though the combined thicknesses of the plates is not great enough to cause the base element 8 to flatten down as the pin ends ride up on the flat portions 16ª of the locking surfaces 16, nevertheless, the socket unit still offers a substantially rigid support for the pin ends as the greatest possible distance of flatwise movement between the plates 3 and 4 can be no greater than the height of the segment defined by the lower surface of the base 8 and the outer surface of the plate 3. It will be seen from inspection of Fig. 5 that normally the wing elements 19 are spaced from the locking surfaces 16 a distance less than the diameter of the pin ends 34. Thus, it will be seen that as the pin ends ride up over the lips 17 to engage the locking surfaces 16ª, the pin ends will engage the lower surfaces 20 of the wings camming the same outwardly against the tension set up by the respective bights 21. After the pin ends have been turned a predetermined distance they pass beneath the portions of the cam surfaces 20 which are nearest to the locking surfaces, at which time the wings contract to engage the abutments 26 of the locking elements 25 with the pins so as to prevent ready rotation of the pin ends in a reverse direction. It will be seen, also, that normally the elements 27 overlie at least portions of the extensions 15 of the base aperture and are spaced from the lips 17 a distance less than the diameter of the pin ends 34. As a result, when the pin ends are turned to unlocking position, the tension upon the same by the elements 27 of the wings operates to force them through the lateral extensions 15 to effect an automatic ejection of the stud element to the socket unit.

Although I have illustrated and described preferred embodiments of my invention, I do not wish to be limited thereby because the scope of my invention is best defined by the following claims:

1. In a fastener device of the rotary operative type, a socket unit having a base element adapted to be secured to one of the parts to be fastened, said base element having an aperture and a locking surface adjacent said aperture, a rotary member having a shank adapted to pass through the aperture in said base element and having a projecting portion adapted to engage said locking surface on relative rotation of the parts, and a resilient element integral with said base element, said resilient element having a surface in superposed facing relation to said base element and movable relative to said base element, said resilient element having means adapted to engage with said projecting portion of said rotary member to maintain said projecting portion in fastener engagement with said socket unit.

2. In a fastener device of the rotary operative type, a socket unit having a base element adapted to be secured to one of the parts to be fastened, said base element having an aperture and a raised portion adjacent said aperture having a locking surface, a rotary member having a shank adapted to pass through the aperture in said base element and having a lateral projection adapted to engage said locking surface of said raised portion on relative rotation of the parts, and a resilient element integral with said base element, sai dresilient element having a cam-surface in superposed facing relation to said base element, said resilient element having a cam-element and movable relative to said base element.

said resilient element being normally disposed in predetermined relation to said locking surface so as to be expanded by movement of said projection between said locking surface and said cam during rotation of said rotary member and thereafter contracting to hold said projection in fastener engagement with said locking surface.

3. In a fastener device of the rotary operative type, a socket unit having a base element adapted to be secured to one of the parts to be fastened, said base element having an aperture and an embossment projecting above the plane of said base element and substantially surrounding said aperture, said embossment having a locking surface, a rotary member having a shank adapted to pass through said aperture and having a lateral projection adapted to engage said locking surface of said embossment on relative rotation of the parts, and a resilient wing portion integral with said base element, said wing having a cam surface in superposed facing relation to said base element, said wing being movable relative to said base element and having an abutment cooperating with said lateral projection to maintain said projection in fastener engagement with said base element.

4. In a fastener device of the rotary operative type, a socket unit having a base element adapted to be secured to one of the parts to be fastened, said base element having an aperture and a locking surface adjacent said aperture, a rotary member having a shank adapted to pass through the aperture in said base element and having a lateral projection adapted to engage said locking surface on relative rotation of the parts, a resilient wing portion integrally joined to said base element by a bight, said wing having a cam surface in superposed facing relation to said base element and movable relative to said base element, said wing being normally disposed in predetermined relation to said locking surface so as to be expanded by movement of said projection between said locking surface and said cam surface during rotation of said rotary member and thereafter contracting to hold said projection in fastener engagement with said locking surface.

5. In a fastener device of the rotary operative type, a socket unit having a base element adapted to be secured to one of the parts to be fastened, said base element having an aperture and locking surfaces adjacent said aperture, a rotary member having a shank adapted to pass through said aperture in said base element and having lateral projections on opposed sides thereof adapted to engage said locking surfaces on relative rotation of the parts, and resilient elements integral with opposed sides of said base, said resilient elements extending toward each other from their junction with said base element and each of said resilient elements having a cam portion facing said base, said resilient elements being adapted to engage said lateral projections under spring tension to maintain said projections in fastener engagement with said socket unit.

6. In a fastener device of the rotary operative type, a socket unit having a base element adapted to be secured to one of the parts to be fastened, said base element having an aperture and locking surfaces adjacent said aperture, a rotary member having a shank adapted to pass through said aperture in said base element and having lateral projections on opposed sides thereof adapted to engage said locking surfaces on relative rotation of the parts, and resilient wing portions extending toward each other from opposed sides of said base, each of said wing portions being integrally joined to said respective side of said base by a bight, said wing elements having broad surfaces facing said base and said wing elements being adapted to engage said lateral projections under spring tension to maintain said projections in fastener engagement with said unit.

7. In a fastener device of the rotary operative type, a socket unit having a base element adapted to be secured to one of the parts to be fastened, said base element having a central aperture for receiving an element of a cooperating rotary member and locking surfaces adjacent said aperture, said base element having rivet-receiving apertures spaced from said central aperture, a rotary member having a shank adapted to pass through said central aperture, said shank having lateral projections on opposed sides thereof adapted to engage said locking surfaces on relative rotation of the parts, and resilient wing portions integral with opposed sides of said base, said wing portions extending toward each other from their junction with said base element and each of said wing portions having a broad surface facing said base, each of said wing elements having an opening in alignment with one of said rivet-receiving openings of said base element, and said wing elements cooperating with said lateral projections to hold said projections in fastener engagement with said socket unit.

8. In a fastener device of the rotary operative type, a socket unit having a base element adapted to be secured to one of the parts to be fastened, said base element having an aperture comprising a main portion and a lateral extension of said main portion, a locking surface adjacent said aperture having a lip at one end adjacent said lateral extension, said lip extending angularly downwardly relative to the normal plane of said locking surface, a rotary member having a shank and a lateral projection adapted to pass through said aperture of said base element, said lateral projection being adapted to ride over said lip and engage said locking surface on relative rotation of said parts, and a resilient wing portion integral with said base element, said wing having a cam portion in superposed facing relation to said base element and movable relative to said base element, said cam portion being normally disposed a distance from said locking surface which is less than the diameter of said lateral projection whereby said wing is expanded by movement of said projection between said locking surface and said cam portion during rotation of said rotary member, and said wing thereafter being contractible to hold said projection in fastener engagement with said locking surface.

9. In a fastener device of the rotary operative type, a fastener unit having a base element adapted to be secured to one of the parts to be fastened, said base element having an aperture comprising a main portion and a lateral extension of said main portion, a locking surface adjacent said aperture, said locking surface having a lip at one end thereof adjacent said lateral extension, said lip extending angularly downwardly relative to the normal plane of said locking surface, a rotary member having a shank and a lateral projection adapted to pass through said aperture of said base element, said lateral projection being adapted to ride over said lip and engage said locking surface on relative rotation of said parts, and a resilient element integral with said base element, said resilient element having a portion in superposed relation to said lateral extension of said aperture and said locking surface, said resilient portion being normally disposed a distance from said locking surface which is less than the diameter of said lateral projection whereby said resilient element is expanded by movement of said projection between said locking surface and said resilient element during rotation of said rotary member, said resilient element being thereafter contractible to hold said projection in fastener engagement with said locking face, and the normal distance between said superposed portion of said resilient element and said lateral extension of said aperture being less than the diameter of said lateral projection, whereby said resilient element engages said lateral projection under spring tension to automatically eject the same when said rotary member is turned to unlocking position.

10. In a fastener device of the rotary operative type, a socket unit having a base element adapted to be secured to one of the parts to be fastened, said base element having an aperture comprising a main portion and a lateral extension of said main portion, a locking surface adjacent said aperture, said locking surface having a cam element adjacent said lateral extension, a rotary member having a shank and a lateral projection adapted to pass through said aperture of said base element, said lateral projection being adapted to ride over said cam element and engage said locking surface on relative rotation of said parts, and a resilient element in superposed relation to said base and movable relative to said base, said resilient element cooperating with said lateral projection to maintain said projection in fastened engagement with said locking surface, and said resilient element being disposed in superposed relation to said lateral extension of said aperture so as to engage said lateral projection under spring tension and automatically eject the same when said rotary member is turned to unlocking position.

11. In a fastener device of the rotary operative type, a fastener unit having a base element adapted to be secured to one of the parts to be fastened, said base element having an aperture comprising a main portion and lateral extensions of said main portion, arcuate locking surfaces adjacent opposite sides of said aperture, each of said surfaces extending from adjacent one of said lateral extensions and terminating adjacent the other of said extensions, a rotary member having a shank and lateral projections adapted to pass through said aperture of said base element, said lateral projections being adapted to engage said locking surfaces on relative rotation of said parts, and resilient portions integral with opposed sides of said base and extending toward each other in superposed relation to said locking surfaces, said resilient portions being normally disposed a distance from said locking surface which is less than the diameter of said lateral projections whereby said resilient portions are expanded by movement of said projections between said locking surfaces and said resilient portions during rotation of said rotary member, and said resilient portions being thereafter contractible to hold said projections in fastener engagement with said locking surfaces.

12. In a fastener device of the rotary operative type, a fastener unit having a base element adapted to be secured to one of the parts to be fastened, said base element having an aperture comprising a main portion and lateral extensions of said main portion, arcuate locking surfaces adjacent opposite sides of said aperture, each of said surfaces extending from adjacent one of said lateral extensions and terminating adjacent the other of said extensions, a rotary member having a shank and lateral projections adapted to pass through said aperture of said base element, said lateral projections being adapted to engage said locking surfaces on relative rotation of said parts, and resilient portions integral with opposed sides of said base and extending toward each other, said resilient portions having elements in superposed relation to said locking surfaces and said transverse extensions of said aperture, said resilient portions being expanded by movement of said projections between said locking surfaces and said resilient portions during rotation of said rotary member, and said resilient portions being thereafter contractible to hold said projections in fastener engagement with said locking surfaces, and the distance between said transverse extensions of said aperture and said elements of said resilient portions in superposed relation thereto being normally less than the diameter of said projections whereby said resilient portions engage said projections to automatically eject the same through said lateral extensions when said rotary member is turned to unlocked position.

13. In a fastener device of the rotary operative type, a socket unit having a slightly bowed base element adapted to be secured to one of the parts to be fastened, said base element having an aperture and a locking surface adjacent said aperture, a rotary member having a shank adapted to pass through the aperture in said base element and having a portion adapted to engage said locking surface on relative rotation of the parts, and a resilient element integral with said base element, said resilient element having a surface in superposed facing relation to said base element and movable relative to said base element, said resilient element being adapted to engage directly with said rotary member to maintain said portion in fastener engagement with said socket unit, and said resilient element being constructed and arranged with relation to said base element to provide ejecting means whereby the said portion of the rotary member is positively ejected from engagement with said locking surfaces when the rotary member is turned toward unlocked position.

HOWARD J. MURPHY.

CERTIFICATE OF CORRECTION.

Patent No. 2,507,004.

December 29, 1942.

HOWARD J. MURPHY.

It is hereby certified that error appears in the printed specification of the above numbered patent requiring correction as follows: Page 2, second column, line 38, after the word "element" strike out "to" and insert instead --of--; line 72, for "sai dresilient" read --said resilient--; line 74-75, strike out ", said resilient element having a cam-element"; and that the said Letters Patent should be read with this correction therein that the same may conform to the record of the case in the Patent Office.

Signed and sealed this 4th day of May, A. D. 1943.

(Seal)

Henry Van Arsdale,
Acting Commissioner of Patents.